(12) United States Patent
Rajan et al.

(10) Patent No.: US 9,670,076 B2
(45) Date of Patent: Jun. 6, 2017

(54) WATER FILTRATION SYSTEM HAVING SELECTIVELY CONFIGURABLE FILTRATION CAPABILITIES

(71) Applicants: Pasupathicoil Ramaswamy Soundar Rajan, Tustin, CA (US); Sowmya Soundar Rajan, Tustin, CA (US)

(72) Inventors: Pasupathicoil Ramaswamy Soundar Rajan, Tustin, CA (US); Sowmya Soundar Rajan, Tustin, CA (US)

(*) Notice: Subject to any disclaimer, the term of this patent is extended or adjusted under 35 U.S.C. 154(b) by 380 days.

(21) Appl. No.: 14/594,339

(22) Filed: Jan. 12, 2015

(65) Prior Publication Data
US 2016/0200598 A1    Jul. 14, 2016

(51) Int. Cl.
| | | |
|---|---|---|
| *B01D 63/00* | (2006.01) |
| *C02F 1/44* | (2006.01) |
| *B01D 35/00* | (2006.01) |
| *B01D 24/00* | (2006.01) |
| *B01D 29/00* | (2006.01) |
| *C02F 1/28* | (2006.01) |
| *C02F 1/00* | (2006.01) |
| *C02F 101/20* | (2006.01) |
| *C02F 101/32* | (2006.01) |
| *C02F 101/10* | (2006.01) |
| *C02F 1/66* | (2006.01) |

(52) U.S. Cl.
CPC ............ *C02F 1/444* (2013.01); *C02F 1/002* (2013.01); *C02F 1/283* (2013.01); *C02F 1/66* (2013.01); *C02F 2101/103* (2013.01); *C02F 2101/20* (2013.01); *C02F 2101/322* (2013.01); *C02F 2201/009* (2013.01); *C02F 2303/02* (2013.01)

(58) Field of Classification Search
CPC ........ B01D 2311/2649; B01D 2313/40; B01D 35/306; B01D 61/00
See application file for complete search history.

(56) References Cited

U.S. PATENT DOCUMENTS

| | | |
|---|---|---|
| 2,781,312 A | 2/1957 | Klumb et al. |
| 3,430,769 A | 3/1969 | Sanzenbacher |
| 3,872,013 A * | 3/1975 | Nishino ............... B01D 69/147 210/317 |
| 4,940,542 A | 7/1990 | Simizu et al. |
| 5,094,363 A | 3/1992 | Monahan et al. |

(Continued)

*Primary Examiner* — Ana Fortuna
(74) *Attorney, Agent, or Firm* — Stetina Brunda Garred and Brucker

(57) ABSTRACT

An adaptable water filtration device including an upstream housing defining an upstream chamber. A filter mount is coupled to the upstream housing and extends into the upstream chamber. A first filter is removably disposed in the upstream chamber and is detachably engaged with the filter mount. The first filter is configured to filter a first contaminant from the contaminated water. A second filter is removably disposed in the upstream chamber and is detachably engaged with the filter mount. The second filter is downstream of the first filter and configured to filter a second contaminant from the contaminated water through adsorption. The water filtration system is configured to enable selective adaptation of the filtering characteristics thereof by a user by selectively disposing the first and second filters in the upstream chamber to achieve a prescribed filtering effect on the contaminated water. A prefilter may be included to prevent downstream clogging.

17 Claims, 4 Drawing Sheets

(56) References Cited

U.S. PATENT DOCUMENTS

| | | | |
|---|---|---|---|
| 5,167,819 A | 12/1992 | Iana et al. | |
| 5,527,451 A * | 6/1996 | Hembree | B01D 24/008 |
| | | | 210/100 |
| 5,545,315 A | 8/1996 | Lonneman | |
| 5,733,448 A | 3/1998 | Kaura | |
| 5,830,360 A * | 11/1998 | Mozayeni | C02F 1/003 |
| | | | 210/266 |
| 6,136,188 A | 10/2000 | Rajan et al. | |
| 6,387,260 B1 * | 5/2002 | Pimenov | B01J 47/024 |
| | | | 210/282 |
| 7,670,479 B2 * | 3/2010 | Arett | A47G 19/12 |
| | | | 210/474 |
| 2006/0066698 A1 * | 3/2006 | Takatsuka | B41J 2/18 |
| | | | 347/93 |
| 2007/0170049 A1 * | 7/2007 | Mansur | B01D 1/0017 |
| | | | 202/160 |
| 2008/0087596 A1 * | 4/2008 | Bommi | C02F 1/002 |
| | | | 210/232 |
| 2008/0110820 A1 * | 5/2008 | Knipmeyer | C02F 1/003 |
| | | | 210/474 |
| 2009/0090661 A1 * | 4/2009 | Tanner | C02F 1/003 |
| | | | 210/87 |
| 2014/0175005 A1 * | 6/2014 | Bradford | C02F 1/003 |
| | | | 210/474 |
| 2015/0284260 A1 * | 10/2015 | Huda | C02F 1/003 |
| | | | 210/128 |
| 2016/0200598 A1 * | 7/2016 | Rajan | C02F 1/444 |
| | | | 210/314 |

* cited by examiner

WATER FILTRATION SYSTEM HAVING SELECTIVELY CONFIGURABLE FILTRATION CAPABILITIES

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention relates generally to a water filtration device, and more specifically to a water filtration device having selectively configurable contaminant filtration capabilities.

2. Description of the Related Art

It is well known that consumption of contaminated water may lead to a host of different health-related issues, including gastrointestinal illness, reproductive problems, and neurological disorders. Furthermore, infants, young children, pregnant women, the elderly, and individuals having compromised immune systems, such as those people suffering from AIDS, undergoing chemotherapy, or taking transplant medications, may have heightened susceptibility to illness from contaminated water.

In view of the various problems associated with contaminated water, several water purification systems have been developed to remove contaminants from the water before the water is consumed. Many large scale purification systems have been developed by municipalities to purify water before it is delivered to each household. In most cases, the purification system provides suitable drinking water, especially in the United States. However, not all residents are satisfied with the municipal purification system, and thus, some residents employ a water purification or filtration system in their own home. The at-home filtration systems may include filtration systems built within the waterline of the house, such that water is filtered by the at-home filter before the water is dispensed through a faucet. In other cases, the at-home filtration system may include a stand-alone water filter pitcher, wherein water from the faucet is poured through a filtering mechanism, wherein the filtered water is captured in an underlying pitcher, where the water remains until it is poured out for consumption by the user.

Although the water filter pitchers provide an additional level of water filtration prior to consumption by the user, conventional water filter pitchers have very limited utility. In particular, conventional water filter pitches typically include fixed filtration capabilities, and include a single filter capable of filtering a specific contaminant from the water supply. In some cases, the water may include other contaminants, which are not filtered out by the conventional water filter pitchers. This is particularly true in rural or underdeveloped areas, where there may be little or no filtration performed prior to the water reaching the residence. Furthermore, conventional water pitchers have limited use in underdeveloped areas with more unique contaminants local to that particular region.

Accordingly, there is a need in the art for an adaptable water filtration system. Various aspects of the present invention address this particular need, as will be discussed in more detail below.

BRIEF SUMMARY OF THE INVENTION

In accordance with one embodiment of the present invention, there is provided an adaptable water filtration device for filtering contaminated water. The water filtration device includes an upstream housing defining an upstream chamber. The upstream housing includes an inlet port and an outlet port in communication with the upstream chamber. A filter mount is coupled to the upstream housing and extends into the upstream chamber. A first filter is removably disposed in the upstream chamber and is detachably engaged with the filter mount. The first filter is configured to filter a first contaminant from the contaminated water. A second filter is removably disposed in the upstream chamber and is detachably engaged with the filter mount. The second filter is downstream of the first filter and is configured to filter a second contaminant from the contaminated water through adsorption. The water filtration device is additionally configured to enable selective adaptation of the filtering characteristics of the water filtration device by a user by selectively disposing the first and second filters in the upstream chamber to achieve a prescribed filtering effect on the contaminated water.

The water filtration device may further include a downstream housing coupled to the upstream housing. The downstream housing may define a downstream reservoir in fluid communication with the outlet port on the upstream housing to collect filtered water therefrom. The downstream housing may be formed of naturally available mud.

The water filtration device may include a pump in fluid communication with the upstream chamber to selectively pressurize the upstream chamber to generate water flow through the first filter and the second filter.

The water filtration device may include an outlet filter disposable adjacent the outlet port and adapted to enhance the mineral content of water flowing through the outlet port.

The first filter in the water filtration device may be a micro filter. The micro filter may be configured to filter bacteria or microorganisms from the water. The second filter may be a specifically processed GAC carbon filter capable of removing heavy metals, bad odor, bad taste, volatile organic compounds (VOCs), etc. from the contaminated water through an adsorption process. A third filter may be a heavy concentration arsenic removal filter (based on the arsenic concentration level in the source water) downstream of the first filter and configured to filter a third contaminant from the contaminated water. If the source water includes heavy iron as a contaminant, the third filter may be a heavy concentration iron removal filter capable of removing concentrated iron from the contaminated water.

The water filtration device may also include a prefilter as the most upstream filtering element. The prefilter may remove sediments and particulate materials (PM 2.5), which may prevent fine pores in a downstream microfilter from becoming clogged. In general, all filter configurations may use a prefilter as the upstream filtering element to provide users the option to use source water with minimal sediment and particulate material (PM 2.5) or source water with high concentration of sediments and particulate material (PM 2.5) to prevent potential clogging of the first microfilter downstream.

The water filtration device may be adapted to operate without requiring any electricity, battery, or solar power.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION OF THE INVENTION

Figure 1:
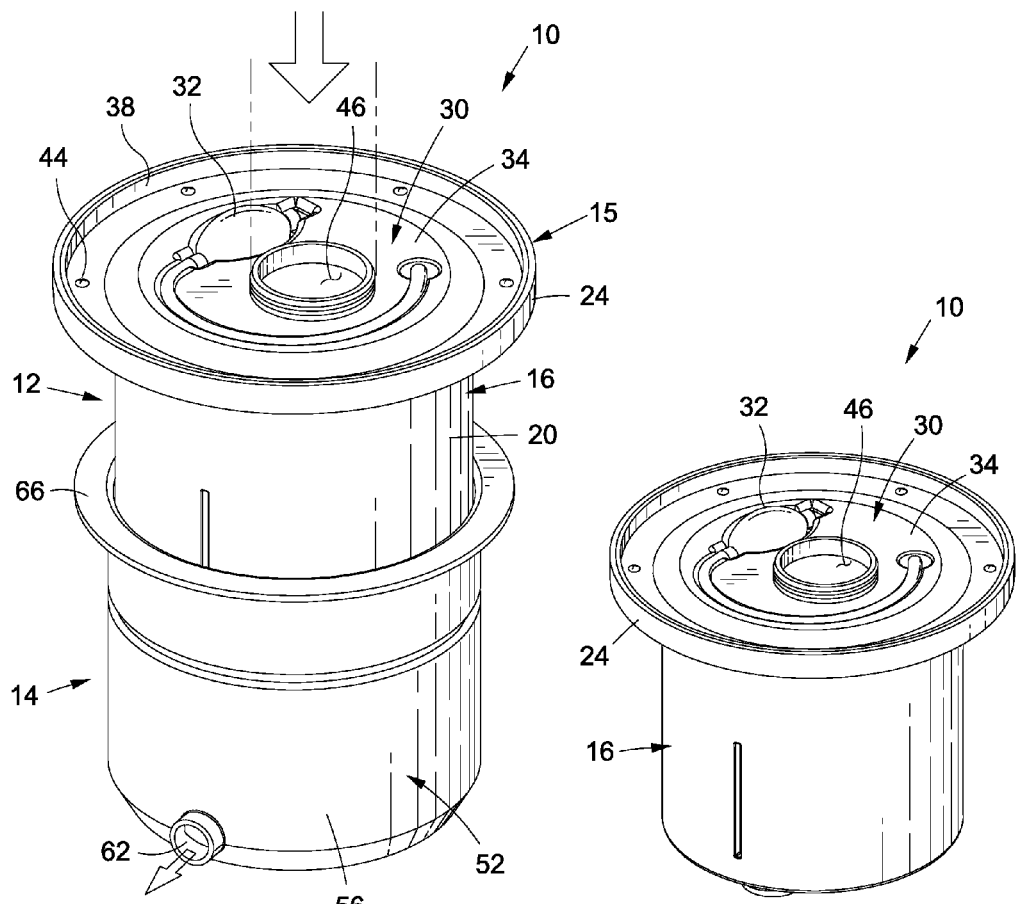
FIG. 1 is an upper perspective view of a water filtration device having an upper housing and a lower housing constructed in accordance with an embodiment of the present invention.
Figure 2:
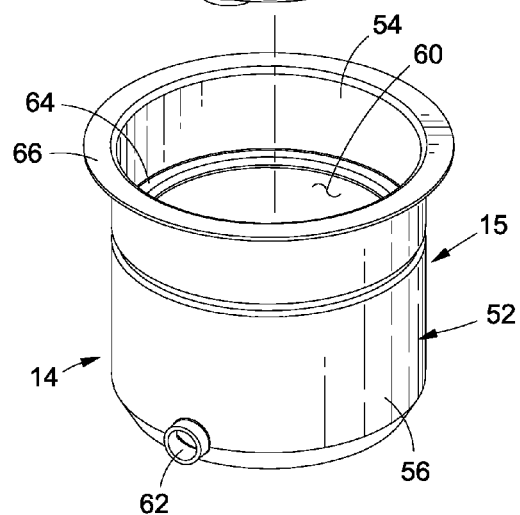
FIG. 2 is an upper perspective exploded view of the water filtration device depicted in FIG. 1, wherein the upper housing is exploded from the lower housing.

The detailed description set forth below in connection with the appended drawings is intended as a description of certain embodiments of a water filter and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now to the drawings, wherein the showings are for purposes of illustrating a preferred embodiment of the present invention only, and not for purposes of limiting the same, there is depicted a water filtration device 10 having selectively configurable filtration capabilities, which allows the filtration device 10 to be used throughout the world to filter out contaminates that are prevalent in a particular geographical region to provide clean drinking water.

Figures 3, 4:
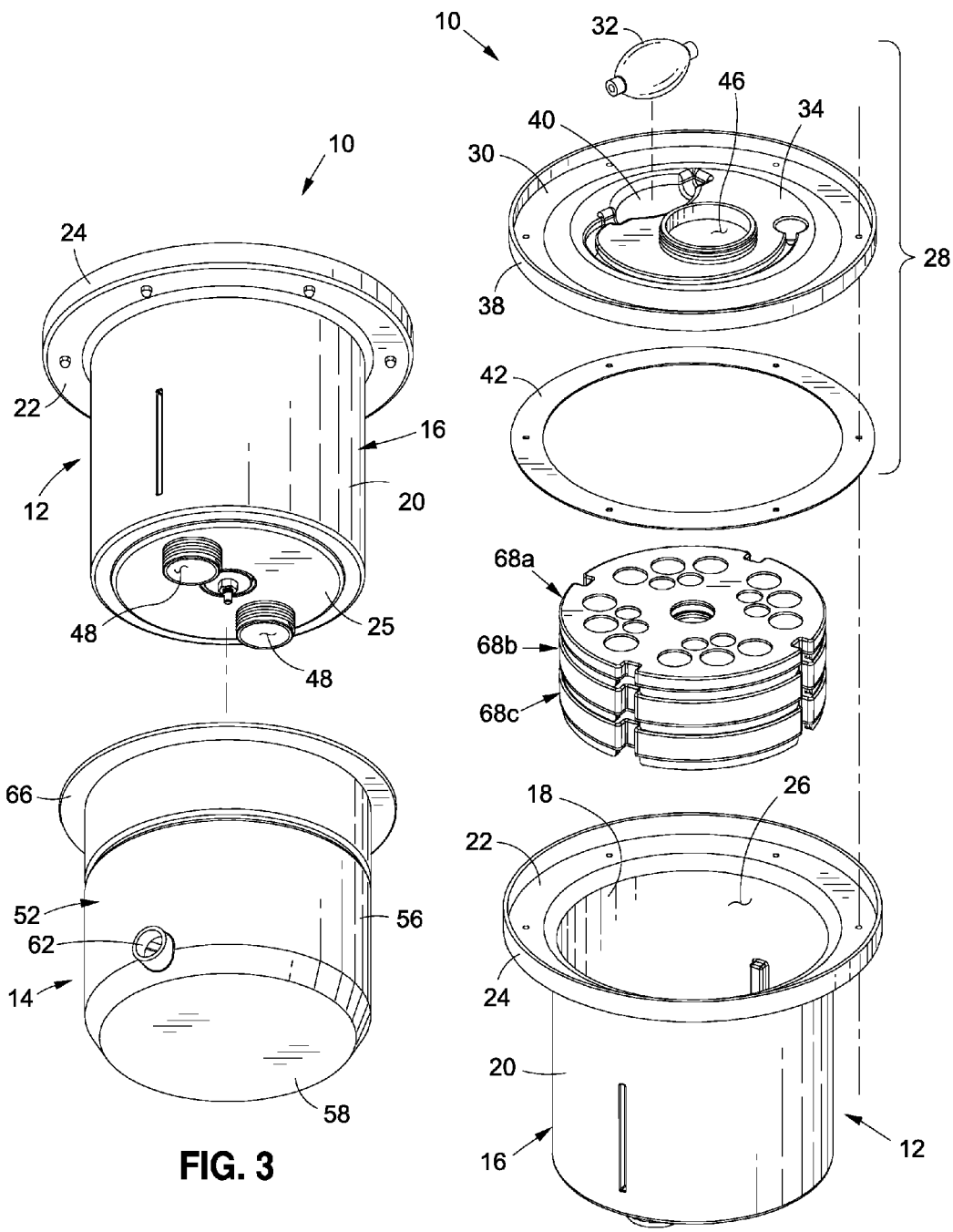
FIG. 3 is a lower perspective exploded view of the water filtration device depicted in FIG. 1.
FIG. 4 is an upper perspective exploded view of the upper housing and a stack of filtration cartridges configured to be received within the upper housing.
Figure 5:
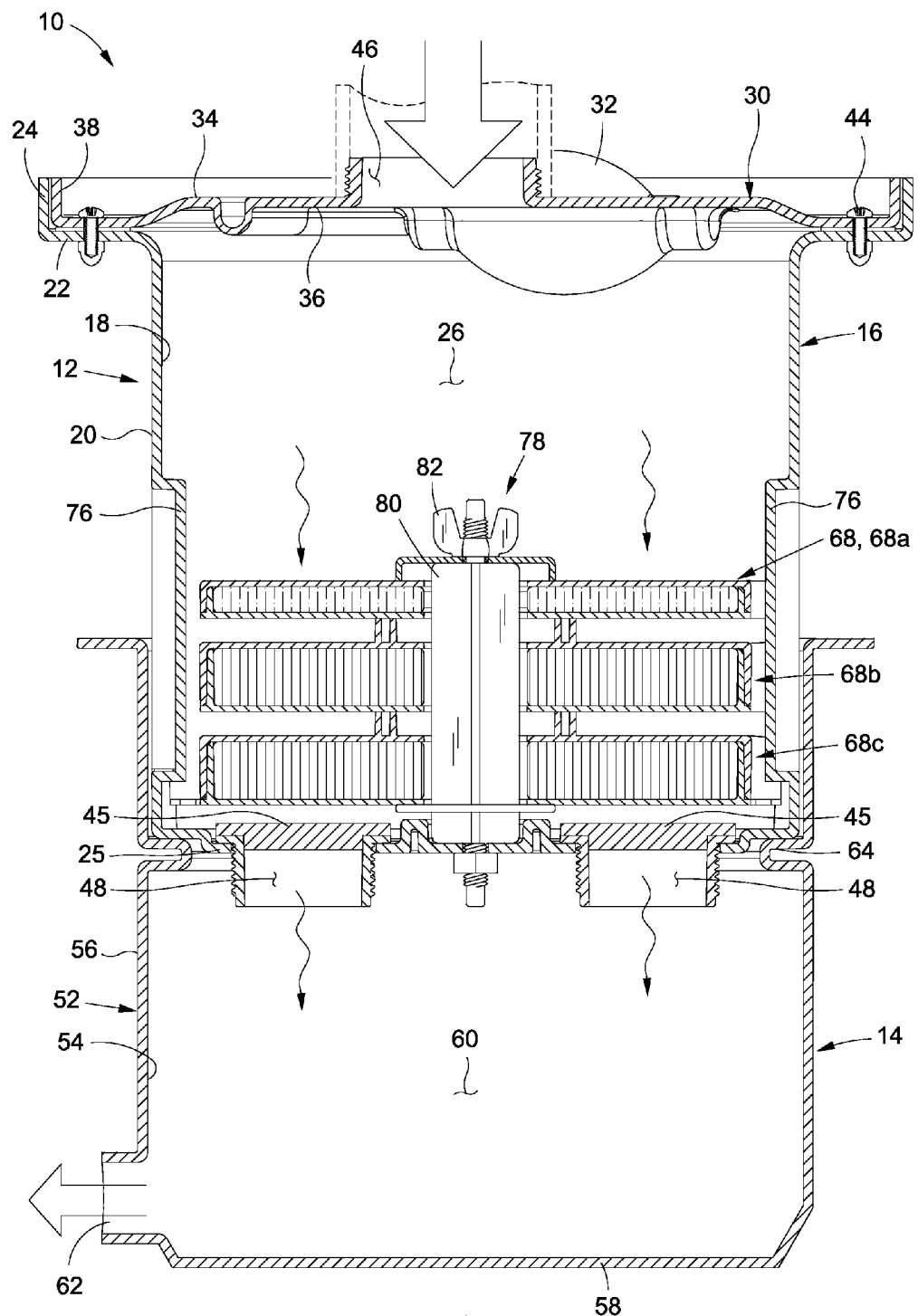
FIG. 5 is an assembled cross sectional view of the water filtration device.
Figure 6:
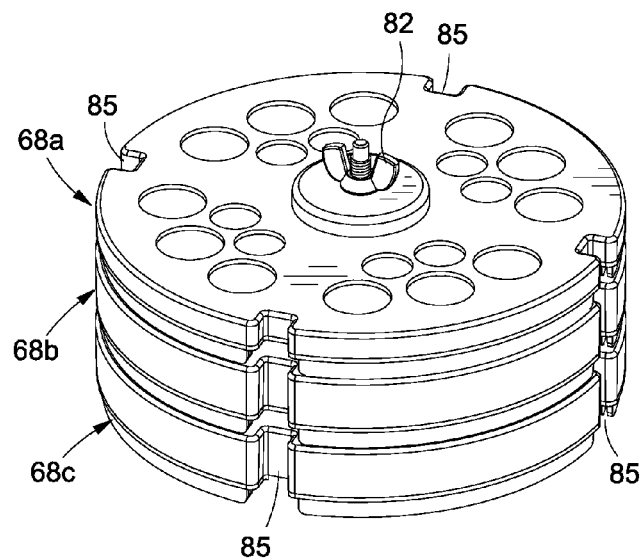
FIG. 6 is an upper perspective view of the stack of filtration cartridges.

The water filtration device 10 generally includes an upper housing 12 (e.g., an upstream housing) and a lower housing 14 (e.g., downstream housing). The upper housing 12 is adapted to be at least partially received within the lower housing 14, as will be described in more detail below. The upper housing 12 includes a main unit 15 including a cylindrical wall 16 having an inner surface 18 (see FIGS. 4 and 5) and an opposing outer surface 20. A lower end wall 25 (see FIG. 3) is coupled to an end of the cylindrical wall 16 to define a closed end of the main unit 15. An upper annular flange 22 (see FIG. 4) protrudes radially outward from the cylindrical wall 16, and an outer cylindrical wall 24 protrudes upwardly from the outer periphery of the upper flange 22. The upper housing 12 includes an upper chamber 26 at least partially defined by the inner surface 18 of the cylindrical wall 16.

The upper housing 12 additionally includes a cover assembly 28 (see FIG. 4) sized and configured for use with the main unit 15, wherein the cover assembly 28 includes a cover body 30 and a pump 32. The cover body 30 includes an outer surface 34 and an opposed inner surface 36 (see FIG. 5). A peripheral wall 38 extends upwardly from the outer periphery of the cover body 30. The pump 32 to pressurize upper housing 12 may have a bulbous configuration and the cover body 30 may include a recess 40 that is complimentary to the pump 32 and is adapted to receive the pump 32 therein. A tube or straw (not shown) may be connected to the pump 32 to place the pump in fluid communication with the upper chamber 26, as will be described in more detail below. The cover assembly 28 also includes a gasket 42 which resides between the cover body 30 and the main unit 15 when the cover body 30 is attached thereto.

The cover assembly 28 is configured to be received within the outer cylindrical wall 24 of the main unit 15. In particular, the peripheral wall 38 is of a slightly smaller diameter than the outer cylindrical wall 24 to allow the cover body 30 to be nested and received within the outer cylindrical wall 24. The cover assembly 28 may be secured to the upper flange 22 via one or more screws 44 or other mechanical fasteners known in the art. When the cover assembly 28 is coupled to the flange 22, the cover body 30 and main unit 15 collectively define the upper chamber 26.

The upper housing 12 includes an inlet port 46 formed within the cover body 30, and one or more outlet ports 48 formed within an end wall 25. The inlet and outlet ports 46, 48 are both in fluid communication with the upper chamber 26. A cap (not shown) may be coupled to the cover body via threaded engagement to cover the inlet port 46. The cap may be removed to open the inlet port 46 for pouring water into the upper housing 12. Alternatively, a one-way valve may be disposed in the inlet port 46 to allow water to flow into the upper chamber 26, while the valve may prevent water from flowing out of the upper chamber 26.

A filter 45 (see FIG. 5), such as a mineral filter, may be disposed within the outlet ports 48 to enhance the mineral content of water flowing through the outlet ports 48. The filter is preferably fabricated from a clear, see-through plastic or similar material to enable a user to observe a level of pH neutralizing media remaining in the filter. According to one embodiment, the filter 45 may be the final filter through which the water passes before flowing into a storage reservoir. Accordingly, the filter 45 may be filled with a prescribed amount of pH neutralizing media for bringing the pH of the filtered water close to neutral (e.g., close to a pH of 7). Along these lines, in an effective filtration process, in addition to remove or reduction of various contaminants, the filtration process will also result in the removal or reduction of Total Dissolved Solids (TDS), like Chlorides, Nitrates, etc., in the water. The reduction in TDS in the filtered water lowers the pH level, thus making the filtered output water slightly acidic. Regular consumption of water that is acidic (particularly water having a pH below 5) is unhealthy. Therefore, by passing the water through the filter 45, which includes pH increasing media, the pH level of the slightly acidic water may be increased to be substantially pH neutral, which is healthier to consume.

As noted above, the filter 45 includes a prescribed amount of pH neutralizing media. According to one embodiment, the amount of such media added to the filter 45 is determined by slowly adding a measured quantity of the media to a unit volume (e.g., 1 Liter) of filtered water until the measured amount of media dissolves completely and the pH level reaches pH neutral (or substantially close to pH neutral, e.g., 6.5-7.5). The total amount of pH media required for use in the output filter 45 is based on the media required per unit volume multiplied by the filtration capacity of the cartridge assembly. As the filtered water continues to flow through the final output filter 45, the pH neutralizing media in the filter 45 will eventually dissolve into the output water, and the user can observe it through the see-through cartridge pH neutralizing filter. This is an indication to the user that the cartridge assembly may need to be replaced.

The lower housing 14 includes a lower cylindrical wall 52 having an inner surface 54 and an outer surface 56. An end wall 58 is coupled to the lower cylindrical wall 52 to define a closed end of the lower housing 14. The end wall 58 and inner surface 54 of the lower cylindrical wall 52 collectively define a lower reservoir 60, the purpose of which will be described in more detail below. The lower housing 14 additionally includes an outlet 62 in fluid communication with the lower reservoir 60. The lower housing 14 may also include a lip or flange 64 extending radially inward from the inner surface 54 of the lower cylindrical wall 52 to provide a surface upon which the upper housing 12 may be supported. The lower housing 14 may further include an upper flange 66 extending radially outward from the lower cylindrical wall 52 to provide a surface for lifting the water filtration device 10.

The upper and lower housings 12, 14 may be formed of any materials known in the art, including, but not limited to, plastic glass, rubber, etc. It is also contemplated that in certain environments it may be beneficial to form at least the lower housing 14 from a naturally-available mud. A lower housing 14 formed from mud may be particularly useful in environments that are very hot, as the mud container includes very tiny pores on the surface through which very fine water particles seep through from the filtered water retained within the lower housings 14. Heat is extracted from water inside the mud container, which results in evaporation of the water particle using the latent heat of evaporation. The evaporation process using the heat from the water inside the mud container causes the water to lose heat, thereby making the water cool, and more desirable for drinking.

The upper and lower housings 12, 14 may also be fabricated in a wide range of sizes. For instance, the upper chamber 26 and lower reservoir 60 may be sized to accommodate approximately one liter of filtered water for use on a tabletop or desktop. In other embodiment, the upper chamber 26 and lower reservoir 60 may be sized to accommodate approximately ten liters of filtered water, which may be suitable for a countertop application. Furthermore, in yet another embodiment, the upper chamber 26 and lower reservoir 60 may be sized to accommodate approximately twenty liters of filtered water, which may be useful as a floor model to serve an entire family. It is understood that the above-described volumes are exemplary in nature only, and are not intended to limit the scope of the present invention. As such, it is expressly contemplated that the size of the filtering device 10 may accommodate volumes less than one liter or greater than twenty liters.

The water filtration device 10 additionally includes one or more filtration cartridges 68 disposed within the upper chamber 26 to filter contaminated water before the water flows from the upper chamber 26 and into the lower reservoir 60. The exemplary water filtration device 10 depicted in FIG. 5 includes a stack of three filtration cartridges 68 disposed within the upper chamber 26, however it is understood that in other implementations, fewer than three filtration cartridges 68 may be used, or alternatively, more than three filtration cartridges 68 may be used without departing from the spirit and scope of the present invention. Along these lines, one unique aspect of the water filtration device 10 is the adaptive water filtration capabilities of the filtration device 10. This unique filtration adaptability is attributable to the ability of the user to select the specific filtration cartridges 68 that are needed to filter prescribed contaminants from the water. For instance, if it is known that Arsenic is in the contaminated water, then a filtration cartridge 68 specifically adapted to remove Arsenic may be disposed within the upper chamber 26. The Arsenic-removing filtration cartridge 68 may include high arsenic removal resin for removing/reducing the high concentration arsenic in the source water being filtered to an acceptable minimum level set forth in according to health standards, such as the WHO or EPA. However, if Arsenic is not in the contaminated water, and instead, Iron or other heavy metals are in the contaminated water, then a filter cartridge 68 designed to remove the Iron or other heavy metal(s0 may be used in the device 10. As such, the user may select which filtration cartridges 68 are used in the device 10 based on the contaminants located in the water. In this regard, the specific contaminants located in the water dictate which filtration cartridges 68 are used in the device 10. As such, the device 10 is not limited to filtering one specific contaminant or set of contaminants from the water. Rather, the device 10 may be specifically configured which allows the device 10 to be used throughout the world to provide clean drinking water. Consequently, the device 10 is highly adaptable and provides more flexible filtration capabilities, particular when compared to conventional pitcher-style water filtration devices.

According to one embodiment, each filtration cartridge 68 includes a first cartridge body 70 and a second cartridge body 72 which collectively capture a filter 74a-c therebetween. The first and second cartridge bodies 70, 72 and the filter 74a-c each include a respective central opening 71, 73, 75 which are coaxially aligned when the filtration cartridge 68 is assembled. The cartridge bodies 70, 72 may be formed from plastic, glass or other materials known in the art. In addition, although the cartridge bodies 70, 72 are shown as having a circular configuration, it is understood that the cartridge bodies 70, 72 may be formed in other shapes and configurations. It is desirable that the filtration cartridges 68 define a shape that is generally complimentary to the shape of the upper chamber 26.

The first and second cartridge bodies 70, 72 and the filter 74a-c may include one or more peripheral notches aligned with each other to prevent rotation of the filtration cartridges 68 within the upper housing 12, as will be described in more detail below. The upper housing 12 may include one or more fins 76 extending into the upper change 26 from the cylindrical wall 16, wherein the fins 76 are specifically configured and adapted to engage with respective ones of the notches 85 formed on the filtration cartridges 68.

Figure 7:
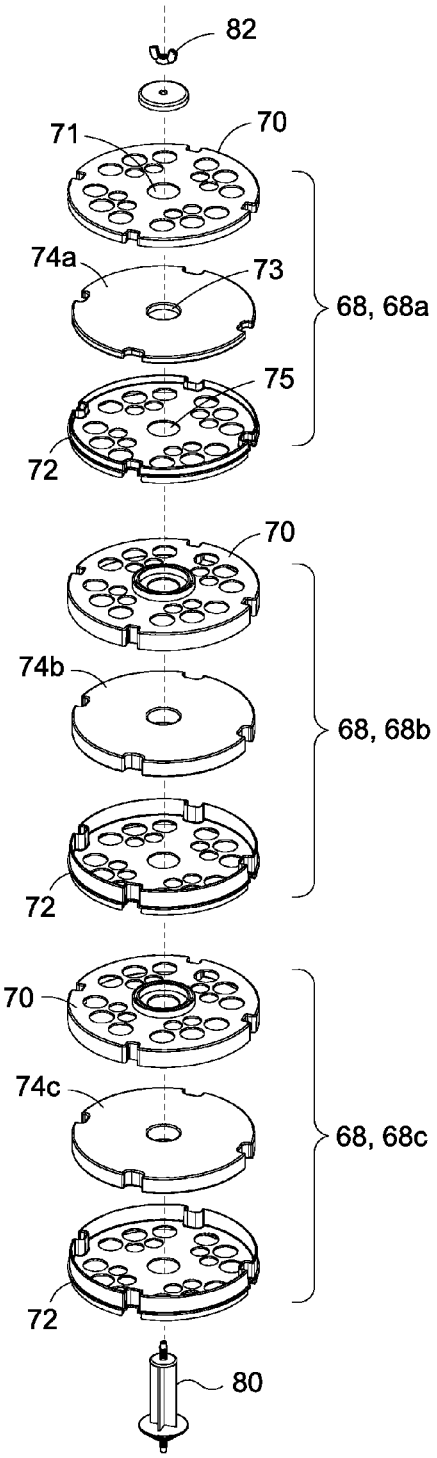
FIG. 7 is an exploded view of the stack of filtration cartridges depicted in FIG. 6.

The filter used in the filtrations cartridge 68 may vary from one cartridge to the next. Along these lines, FIG. 7 shows a first filter 74a incorporated into a first filtration cartridge 68a, a second filter 74b incorporated into a second filtration cartridge 68b, and a third filter 74c incorporated into a third filtration cartridge 68c. The filters 74a-c may have different filtration capabilities, e.g., they may be designed to remove different contaminants from the water.

The filtration device 10 includes a filter mount 78 coupled to the upper housing 12 and extending into the upper chamber 26. The filter mount 78 may include an elongate shaft 80 extending upwardly from the end wall 25 of the upper housing 12. The filtration cartridges 68 may be disposed within the upper chamber 26 in a stacked configuration, with the shaft 80 extending through the central opening of each filtration cartridge 68. A nut 82 or other securing means may be tightened onto the shaft 80 to prevent the cartridges from disengaging with the shaft 80.

With the structural features of the water filtration device 10 described above, the following discussion will focus on usage of the water filtration device 10. Contaminated water is poured into the upper chamber 26 through the inlet port 46. The inlet port 46 is preferably closed with a cap to seal the upper chamber 26. The pump 32 is then actuated (e.g., squeezed one or more times) to increase pressure inside the upper chamber 26 to force the contaminated water through the filtration cartridges 68a-c. A pre-filter may be used to remove any sediments from the contaminated water, which would otherwise create a potential blockage in the remaining downstream filters. For instance, the pre-filter may remove sediments and particulate materials (PM 2.5). The water then flows through the stack of filtration cartridges 68 to remove further contaminants. According to one embodiment, the most upstream filtration cartridge 68a includes a micro filter to remove any bacteria, or pathogens. The next (downstream) filtration cartridge 68b may be a specialty media cartridge to remove heavy concentrations of Iron or similar heavy metals. The water may then flow through a filtration cartridge 68c having a mix of granular activated carbon and an Arsenic removal resin. The water may then flow through the output filter 45 which may contain select minerals, such that a mineral concentration is dissolved into the filtered output water as the water flows into the lower reservoir 60. The output filter 45 may also bring the pH level of the water (generally acidic) to a more neutral level (i.e., close to a pH level of 7), as described in more detail above.

According to one embodiment, the filters 74a-c employed in the filtration cartridges 68a-c use adsorption to effectively adsorb contaminants like Volatile Organic Compounds (VOC), bad odors, and bad tastes.

Once the water reaches the lower reservoir 60, a significantly high percentage of the contaminants originally present in the contaminated water will have been filtered out. According to one embodiment, approximately 99% of the contaminants will be removed through the passage of the contaminated water through the various filters located in the flowpath through the upper housing 12 into the lower housing 14.

The filtered water may remain in the lower reservoir 60 until the user is ready to drink the water. The water may be disposed through a valve or faucet coupled to the outlet 62 of the lower housing 14.

Each filter 74a-c is configured to remove contaminants to an acceptable level. When any filter 74a-c reaches a saturation point, any addition of contaminated water to the filtered assembly will start reducing filtration capability and the contamination in the output filtered water will start increasing, which is an indication that the filter 74a-c needs to be replaced.

Although the foregoing describes the device 10 as being adapted to filter water, it is understood that other implementations of the device 10 may be used to filter other liquids.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

The invention claimed is:

1. A water filtration device for filtering contaminated water, the water filtration device comprising:
    a first housing defining a first chamber, the first housing having an inlet port and an outlet port in communication with the first chamber, the first housing adapted to be fluidly connectable with a reservoir;
    a filter mount coupled to the first housing and extending into the first chamber from a first housing end wall;
    a first filter removably disposed in the first chamber and detachably engaged with the filter mount, the first filter being configured to filter a first contaminant from the contaminated water; and
    a second filter removably disposed in the first chamber and detachably engaged with the filter mount, the second filter being downstream of the first filter and configured to filter a second contaminant from the contaminated water through adsorption;
    the water filtration device being configured to enable selective adaptation of the filtering characteristics thereof by a user by selectively disposing the first and second filters in the first chamber to achieve a prescribed filtering effect on the contaminated water.

2. The water filtration device recited in claim 1, further comprising a second housing coupled to the first housing and defining the reservoir in fluid communication with the outlet port on the first housing to collect filtered water therefrom.

3. The water filtration device recited in claim 2, wherein the second housing is formed of naturally available mud.

4. The water filtration device recited in claim 1, further comprising a pump in fluid communication with the first chamber to selectively pressurize the first chamber to generate water flow through the first filter and the second filter.

5. The water filtration device recited in claim 1, further comprising an outlet filter disposable adjacent the outlet port and adapted to enhance mineral content of water flowing through the outlet port.

6. The water filtration device recited in claim 1, wherein the first filter is a micro filter, the second filter is a carbon filter that removes at least one of heavy metals, VOC's and bad odor from the contaminated water, the water filter further comprising:
    a third filter removably disposed in the first chamber and detachably engaged with the filter mount, the third filter being downstream of the first filter and configured to filter a third contaminant from the contaminated water.

7. The water filtration device recited in claim 6, wherein the third carbon filter includes an arsenic removal resin configured to remove arsenic from the contaminated water.

8. The water filtration device recited in claim 7, wherein the third carbon filter is configured to remove Arsenic III and Arsenic V from the contaminated water.

9. The water filtration device recited in claim 1, further comprising a pH neutralizing mineral media in fluid communication with the second filter and capable of increasing the pH of water flowing therethrough.

10. A selectively configurable water filtration system having configurable filtration capabilities, the selectively configurable water filtration system comprising:
- a first housing defining an first chamber, the first housing having an inlet port and an outlet port in communication with the first chamber, the first housing adapted to be fluidly connectable with a reservoir;
- a filter mount coupled to an end wall of the first housing and extending into the first chamber; and
- a plurality of filtering devices having discrete filtering capabilities, each filtering device being selectively disposable in the first chamber and engageable with the filter mount;
- the filtering capabilities of the water filtration system being selectively adjustable by selecting which ones of the plurality of filtering devices is disposed within the first chamber.

11. The selectively configurable water filtration system recited in claim 10, further comprising a second housing coupled to the first housing and defining the reservoir in fluid communication with the outlet port on the first housing to collect filtered water therefrom.

12. The selectively configurable water filtration system recited in claim 11, wherein the second housing is formed of naturally available mud.

13. The selectively configurable water filtration system recited in claim 10, further comprising a pump in fluid communication with the first chamber to selectively pressurize the first chamber to generate water flow through the first filter and the second filter.

14. The selectively configurable water filtration system recited in claim 10, further comprising an outlet filter disposable adjacent the outlet port and adapted to enhance mineral content of water flowing through the outlet port.

15. The selectively configurable water filtration system recited in claim 10, wherein the plurality of filters includes:
- a first filter that is a micro filter;
- a second filter that is a carbon filter to remove at least one of heavy metals, bad odor, bad taste, and VOC's from the contaminated water; and
- a third carbon filter configured to filter a third contaminant from the contaminated water.

16. The selectively configurable water filtration system recited in claim 15, wherein the third filter includes an arsenic removal resin configured to remove arsenic from the contaminated water.

17. The selectively configurable water filtration system recited in claim 16, wherein the third carbon filter is configured to remove Arsenic III and Arsenic V from the contaminated water.

\* \* \* \* \*